(12) United States Patent
Kushevsky et al.

(10) Patent No.: US 9,349,125 B2
(45) Date of Patent: *May 24, 2016

(54) SYSTEM AND METHOD OF LOADING A TRANSACTION CARD AND PROCESSING REPAYMENT ON A MOBILE DEVICE

(71) Applicant: XROMB INC., Toronto (CA)

(72) Inventors: Mikhail Kushevsky, Toronto (CA); Michael Fainshtein, King City (CA); Valdis Andris Martinsons, Toronto (CA)

(73) Assignee: XRomb Inc., Toronto, ON ( * ) Notice: Subject to any disclaimer, the term of this patent is extended or adjusted under 35 U.S.C. 154(b) by 0 days.

This patent is subject to a terminal disclaimer.

(21) Appl. No.: 14/284,826

(22) Filed: May 22, 2014

(65) Prior Publication Data

US 2014/0252087 A1 Sep. 11, 2014

Related U.S. Application Data

(63) Continuation of application No. 13/464,484, filed on May 4, 2012, now Pat. No. 8,763,896.

(60) Provisional application No. 61/602,421, filed on Feb. 23, 2012.

(51) Int. Cl.
*G06Q 20/36* (2012.01)
*G06Q 30/06* (2012.01)
*G06Q 20/32* (2012.01)

(52) U.S. Cl.
CPC .......... *G06Q 20/3672* (2013.01); *G06Q 20/322* (2013.01); *G06Q 20/327* (2013.01); *G06Q 20/3278* (2013.01); *G06Q 20/3674* (2013.01); *G06Q 30/0601* (2013.01)

(58) Field of Classification Search
CPC .......... G06Q 20/3672; G06Q 20/3278; G06Q 20/227; G06Q 20/322; G06Q 20/3674; G06Q 30/0601
See application file for complete search history.

(56) References Cited

U.S. PATENT DOCUMENTS

| 6,776,339 B2 | 8/2004 | Piikivi |
| 8,083,140 B1 | 12/2011 | Katzer et al. |

(Continued)

FOREIGN PATENT DOCUMENTS

| EP | 1107196 A1 | 6/2001 |
| EP | 2056246 A1 | 5/2009 |

(Continued)

OTHER PUBLICATIONS

International Search Report. PCT/CA2013/000151. Date of mailing May 21, 2013.

(Continued)

*Primary Examiner* — Sonji Johnson
(74) *Attorney, Agent, or Firm* — Bereskin & Parr LLP S.E.N.C.R.L., s.r.l.

(57) ABSTRACT

The embodiments described herein provide in one aspect, a method of loading a transaction card account onto a mobile device, the mobile device comprising a memory and a contactless reader, the method comprising: reading, via the contactless reader, transaction card information from a physical contactless transaction card corresponding to the transaction card account; sending a retrieval message, to an issuer server, to retrieve a card security credential for the transaction card account, the retrieval message comprising the transaction card information for identifying the transaction card account at the issuer server; receiving, from the issuer server, a card security credential for the transaction card account; and storing, the transaction card information and the card security credential as a transaction card corresponding to the transaction account, on the memory of the mobile device.

20 Claims, 13 Drawing Sheets

(56) References Cited

U.S. PATENT DOCUMENTS

| | | |
|---|---|---|
| 2002/0038287 A1 | 3/2002 | Villaret et al. |
| 2004/0127256 A1 | 7/2004 | Goldthwaite et al. |
| 2006/0165060 A1 | 7/2006 | Dua |
| 2007/0057038 A1 | 3/2007 | Gannon |
| 2008/0275779 A1 | 11/2008 | Lakshminarayanan |
| 2009/0312011 A1 | 12/2009 | Huomo et al. |
| 2010/0051689 A1 | 3/2010 | Diamond |
| 2010/0131413 A1 | 5/2010 | Kranzley et al. |
| 2010/0169215 A1 | 7/2010 | Balasubramanian et al. |
| 2010/0274677 A1 | 10/2010 | Florek et al. |
| 2010/0303230 A1 | 12/2010 | Taveau et al. |
| 2011/0078034 A1 | 3/2011 | Hayhow |
| 2011/0218911 A1 | 9/2011 | Spodak |
| 2012/0290449 A1 | 11/2012 | Mullen et al. |
| 2013/0132283 A1 | 5/2013 | Hayhow et al. |

FOREIGN PATENT DOCUMENTS

| | | |
|---|---|---|
| JP | 2003099695 A | 4/2003 |
| WO | 2009102785 A1 | 8/2009 |
| WO | 2010/114499 A2 | 10/2010 |

OTHER PUBLICATIONS

Written Opinion. PCT/CA2013/000151. Date of mailing May 21, 2013.

PayMeBack App, http://www.geeky-gadgets.com/paymeback-app-keeps-track-of-loaned-money-06-09-2011/.

Extended European Search Report. European Patent Application No. 13751862.7. Date of mailing Sep. 8, 2015.

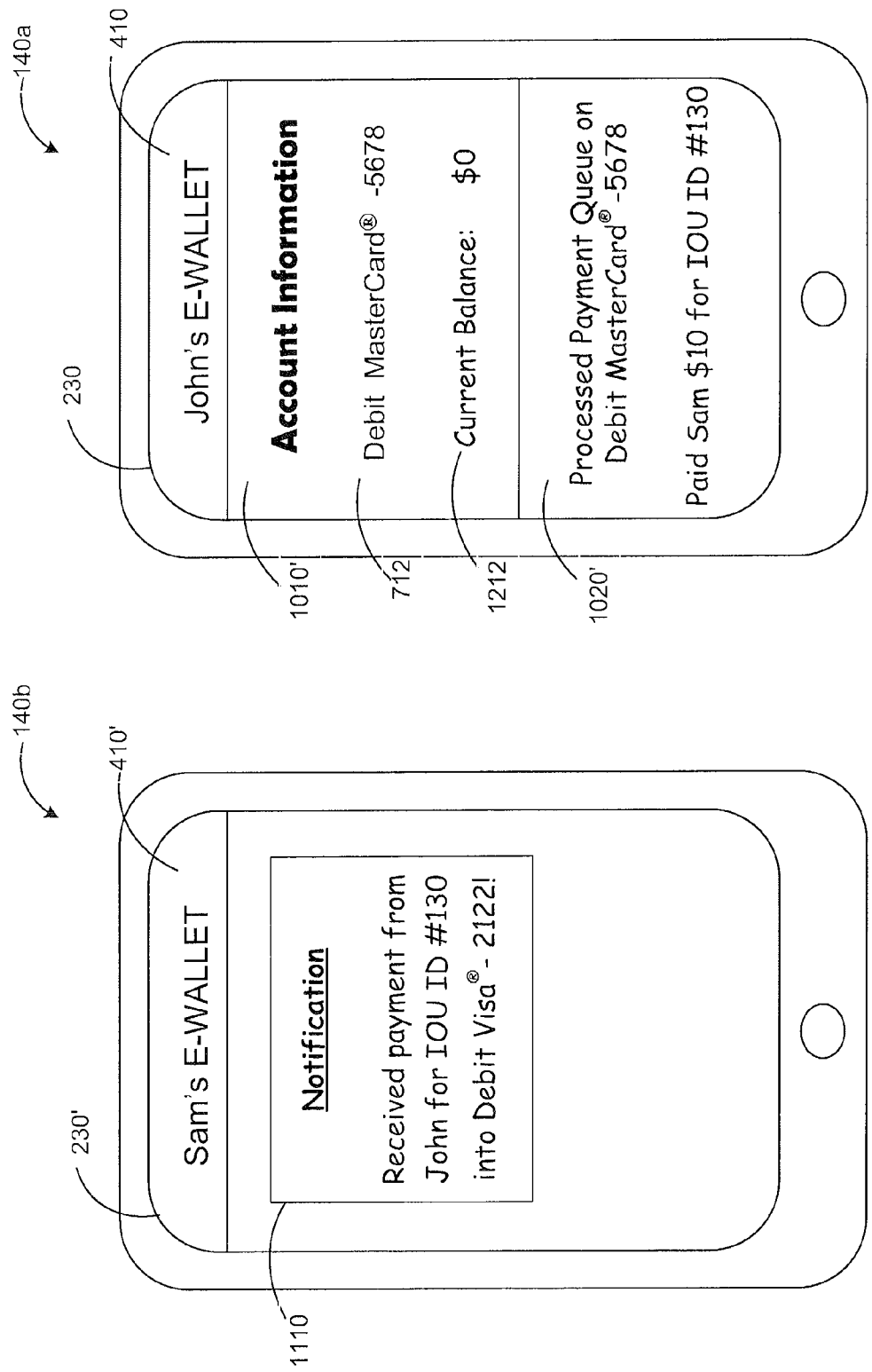

SYSTEM AND METHOD OF LOADING A TRANSACTION CARD AND PROCESSING REPAYMENT ON A MOBILE DEVICE

CROSS-REFERENCE TO RELATED APPLICATIONS

This application is a continuation of U.S. patent application Ser. No. 13/464,484, filed May 4, 2012, which claims priority to U.S. provisional patent application No. 61/602,421, filed Feb. 23, 2012. The entire contents of U.S. patent application Ser. No. 13/464,484 and U.S. provisional patent application No. 61/602,421 are hereby incorporated by reference.

FIELD

The described embodiments relate to a system and method of loading a transaction card and processing repayment on a mobile device.

BACKGROUND

Physical plastic transaction cards (e.g., a payment card such as a debit card or a Visa® credit card) may contain embedded contactless communications technology within the card to enable transmission of transaction card information to a contactless reader at a point-of-sale terminal. Such technology may include specialized integrated circuits (ICs) and antennas that communicate, for example, using the Near Field Communications (NFC) standard.

Modern mobile devices have also started to incorporate such contactless communications technology. Software applications executing on these mobile devices may be configured to use the contactless technology embedded in the mobile devices to enable the mobile device to function as a transaction card.

To avoid having to carry both a mobile device and physical transaction cards, users may desire to load their existing transaction cards onto their mobile device.

Existing methods of loading such existing plastic transaction cards are inefficient and error-prone as they require the manual entry of the transaction card information (e.g., credit card number and expiry date) onto the mobile device.

There is thus a need for improved systems and methods of loading a transaction card onto a mobile device.

After the transaction card is loaded onto the mobile device, the mobile device may be configured for conducting mobile payment transactions, such as peer-to-peer transactions. Certain peer-to-peer payments, such as "I Owe You"s (IOUs), can be difficult to enforce due to their informal nature. Furthermore, the party owing the IOU may not remember to repay the IOU even if that party has available funding.

There is, thus, also a need for ensuring automatic repayment of IOUs as soon as repayment funds are available.

SUMMARY

In a first aspect, some embodiments of the invention provide a method of loading a transaction card account onto a mobile device, the mobile device comprising a memory and a contactless reader, the method comprising:
  reading, via the contactless reader, transaction card information from a physical contactless transaction card corresponding to the transaction card account;
  sending a retrieval message, to an issuer server, to retrieve a card security credential for the transaction card account, the retrieval message comprising the transaction card information for identifying the transaction card account at the issuer server;
  receiving, from the issuer server, a card security credential for the transaction card account; and
  storing,
    the transaction card information, and
    the card security credential
  as a transaction card corresponding to the transaction account, on the memory of the mobile device.

In a second aspect, some embodiments of the invention provide a system for loading a transaction card account onto a mobile device, the system comprising,
  the mobile device comprising a processor; a contactless reader operatively coupled to the processor; and a memory storing a plurality of instructions, which when executed by the processor causes the processor to:
    read, via the contactless reader, transaction card information from a physical contactless transaction card corresponding to the transaction card account;
    send a retrieval message, to an issuer server, to retrieve a card security credential for the transaction card account, the retrieval message comprising the transaction card information for identifying the transaction card account at the issuer server;
    receive, from the issuer server, a card security credential for the transaction card account; and
    store,
      the transaction card information, and
      the card security credential
    as a transaction card corresponding to the transaction account, on the memory of the mobile device.

In a third aspect, some embodiments of the invention provide a method of processing an amount owing from a first transaction account to a second transaction account, the method comprising
  providing a first mobile device comprising a first memory storing a first transaction card corresponding to the first transaction account;
  providing a second mobile device comprising a second memory storing a second transaction card corresponding to the second transaction account;
  receiving at the second mobile device, from the first mobile device, an acknowledgement that acknowledges the amount owing;
  transmitting, from the second mobile device to the first mobile device, an account identifier corresponding to the second transaction account; and
  receiving, at the first mobile device, a load amount to be loaded to the first transaction account, wherein, prior to adding the load amount to the first transaction account, the first mobile device is configured to use the load amount to repay the amount owing to the second transaction account.

In various embodiments, the method may further comprise:
  transmitting, from the first mobile device to an e-wallet server, a repayment message comprising
    the received account identifier corresponding to the second transaction account, and
    the load amount for repaying the amount owing to the second transaction account;
  wherein the e-wallet server is configured to identify the second transaction account from the received account identifier and add the load amount to the second transaction account.

In various embodiments, the load amount is greater than the amount owing, and a remaining amount of the load amount not used to repay the amount owing is added to the first transaction account.

In various embodiments, the load amount is less than the amount owing, and the amount owing is reduced by the load amount.

In various embodiments, the method may further comprise storing, on the first memory, a payment queue associated with the first transaction account, wherein the payment queue comprises a plurality of amounts owing from the first transaction account.

In various embodiments, the first mobile device comprises a first contactless transceiver, and wherein the acknowledgment is transmitted, and the account identifier is received, via the first contactless transceiver.

In various embodiments, the first contactless transceiver comprises a Near Field Communications (NFC) integrated circuit (IC).

In various embodiments, the second mobile device comprises a second contactless transceiver, and wherein the acknowledgement is received, and the account identifier is transmitted, via the second contactless transceiver.

In various embodiments, the second contactless transceiver comprises a Near Field Communications (NFC) integrated circuit (IC).

In a fourth aspect, some embodiments of the invention provide a system for processing an amount owing from a first transaction account to a second transaction account, the system comprising
a first mobile device comprising a first processor and a first memory storing a first transaction card corresponding to the first transaction account;
a second mobile device comprising a second processor and a second memory storing a second transaction card corresponding to the second transaction account, wherein the second processor is configured to:
receive, from the first mobile device, an acknowledgement that acknowledges the amount owing; and
transmit, to the first mobile device, an account identifier corresponding to the second transaction account; and
wherein, the first mobile device configured to:
receive a load amount to be loaded to the first transaction account, and, prior to adding the load amount to the first transaction account, the first mobile device is configured to use the load amount to repay the amount owing to the second transaction account.

In various embodiments, the first mobile device is further configured to
transmit to an e-wallet server, a repayment message comprising
the received account identifier corresponding to the second transaction account, and
the load amount for repaying the amount owing to the second transaction account;
wherein the e-wallet server is configured to identify the second transaction account from the received account identifier and add the load amount to the second transaction account.

In various embodiments, the load amount is greater than the amount owing, and a remaining amount of the load amount not used to repay the amount owing is added to the first transaction account.

In various embodiments, the load amount is less than the amount owing, and the amount owing is reduced by the load amount.

In various embodiments, the first mobile device is further configured to
store, on the first memory, a payment queue associated with the first transaction account, wherein the payment queue comprises a plurality of amounts owing from the first transaction account.

In various embodiments, the first mobile device comprises a first contactless transceiver, and wherein the acknowledgment is transmitted, and the account identifier is received, via the first contactless transceiver.

In various embodiments, the first contactless transceiver comprises a Near Field Communications (NFC) integrated circuit (IC).

In various embodiments, the second mobile device comprises a second contactless transceiver, and wherein the acknowledgement is received, and the account identifier is transmitted, via the second contactless transceiver.

In various embodiments, the second contactless transceiver comprises a Near Field Communications (NFC) integrated circuit (IC).

BRIEF DESCRIPTION OF THE DRAWINGS

A preferred embodiment of the present invention will now be described in detail with reference to the drawings, in which:

FIG. 11 is an example screenshot of a payment received notification, in accordance with an embodiment of the present disclosure;

FIG. 12 is an example screenshot of an account balance screenshot after the amount owing is repaid, that may be shown after the screenshot in FIG. 10, in accordance with an embodiment of the present disclosure;

DESCRIPTION OF EXEMPLARY EMBODIMENTS

Figure 1:
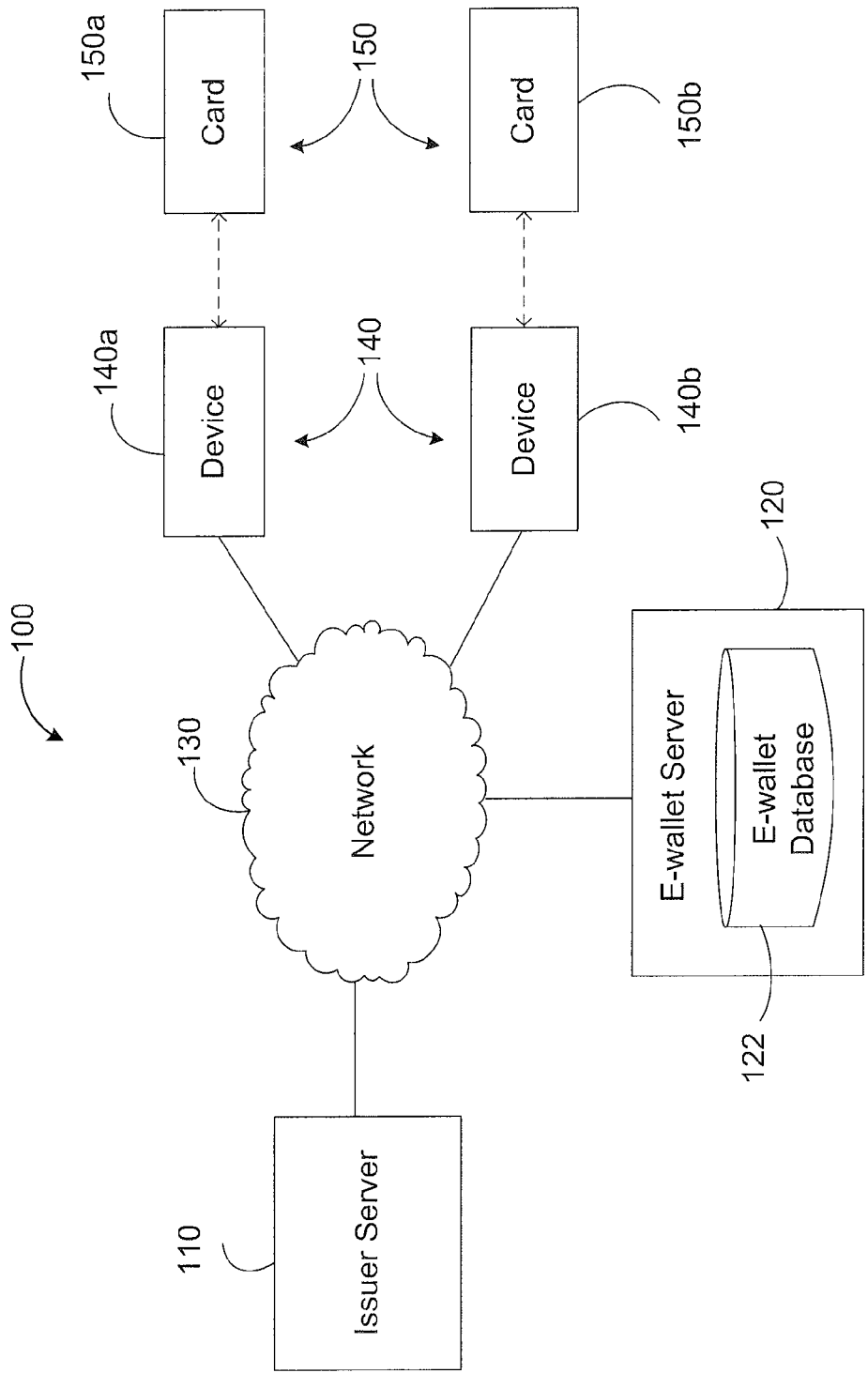
FIG. 1 is a block diagram of a system for loading a transaction card and processing repayment on a mobile device, in accordance with an embodiment of the present disclosure.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor (e.g., a microprocessor), a data storage system (including volatile and non-volatile memory and/or storage elements), at least one input device, and at least one output device. For example and without limitation, the programmable computers (referred to below as computing devices) may be a personal computer, laptop, personal data assistant, cellular telephone, smart-phone device, tablet computer, and/or wireless device. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Reference is first made to FIG. 1, shown there is a block diagram illustrating a system for loading a transaction account and processing repayment on a mobile device, referred to generally as 100. The system may include one or more mobile devices 140, and an e-wallet server 120, each including a network interface (not shown) for connecting to a network 104. The mobile device 140 may interact with one or more transaction cards 150 via contactless communication standards such as NFC. When loading a transaction card onto the mobile device 140, the mobile device 140 may be configured to communicate with issuer server 110 to download to the mobile device 140, a card security credential corresponding to the transaction cards 150.

From a high-level perspective, some embodiments described herein are generally directed to a system of loading a transaction card account corresponding to the transaction card 150 onto a mobile device 140. To do so, the mobile device 140 may be configured to operate a contactless reader embedded within a mobile device 140 to read transaction card information from an existing contactless transaction card 150 to be loaded. Such reading of transaction card information for the purpose of loading onto the mobile device 140 may reduce the likelihood of error over methods of manually entering the transaction card information onto the mobile device 140. Also, employing the contactless reader to read the transaction card information may speed up the process of loading a transaction account onto a mobile device 140.

The various components in FIG. 1 will now be described in greater detail.

Issuer server 110 may include a server from an organization that issues a transaction card. Transaction cards may, for example include payment cards (such as credit cards or debit cards), loyalty rewards card, gift cards, or identification cards. For a credit card (e.g., Visa® or MasterCard®), the issuer server 110 may be a server from the issuer of the credit card. The issuer server 110 may store various data items relating to the transaction account corresponding to the transaction card. Such data items may include a card security credential for the transaction account that may be transmitted to the mobile device 140 as a part of the loading of the transaction card onto the mobile device 140.

Electronic wallet server 120 may store account information related to an electronic wallet (referred to herein as an "e-wallet") application executable on a mobile device 140. For example, such information may include a login username and/or password for an e-wallet account, and/or any transaction accounts associated with the e-wallet account. Such data may be stored in the e-wallet database 122.

In some embodiments, the e-wallet application may be configured to perform various operations performed by the mobile device 140 described herein.

A mobile device 140 may be any computing device that includes a contactless reader (e.g., an NFC chip) operable to read transaction card information from a contactless transaction card. Such devices 110 may include cellular phones, smartphones (e.g., Apple® iPhone®, BlackBerry®, Android™ or other suitable network-connected computing devices such as a tablet computer (e.g., Apple® iPad™) with contactless readers embedded therein. In some embodiments, the mobile device 140 may include a secure element for storing the transaction card.

The network 104 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Figure 2:
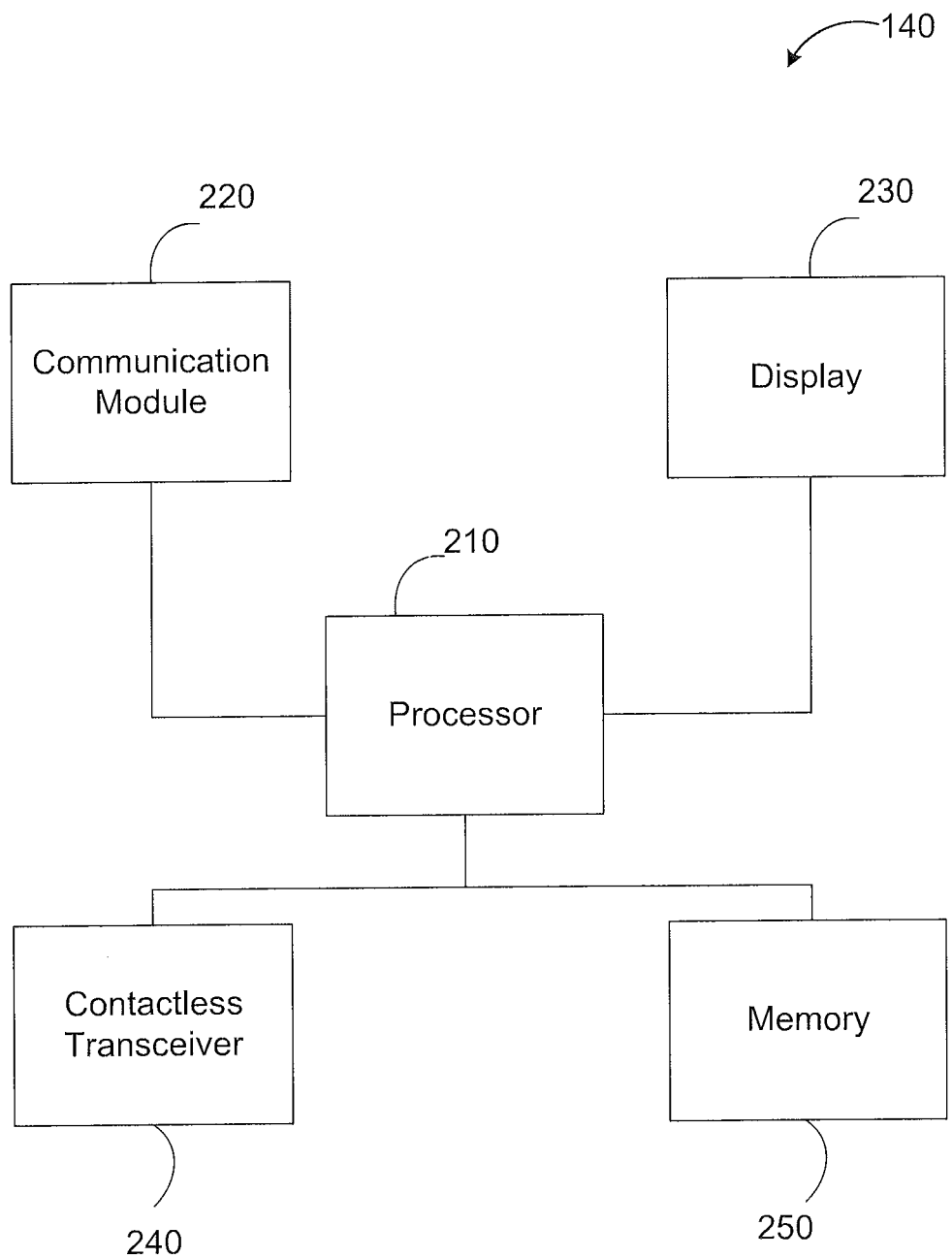
FIG. 2 is a block diagram of a mobile device, in accordance with an embodiment of the present disclosure.

Referring to FIG. 2, therein illustrated is a block diagram of a mobile device 140, shown in greater detail. The mobile device 140 may include a processor 210 that is operatively connected to a communication module 220, a display 230, a contactless transceiver 240 (which may include contactless reader functionality), and a memory 250.

The communication module 220 may be operated by the processor 110 to enable communication between the mobile device 140 and the issuer server 110. The communication module 220 may include various communication components (e.g., dedicated or integrated controllers and/or antennas) that communicate using known wireless communications technologies. For example, the communications module 220 may be configured to operate on one or more of the following standards: Global System for Mobile Communications (GSM), General Packet Radio Service (GPRS), High Speed Packet Access (HSPA), and Long Term Evolution (LTE). Additionally or alternatively, the mobile device may include other components for enabling the apparatus to communicate via other communications standards such as WiFi or Bluetooth.

The display 230 may be operable by the processor 210 to display a user interface for interacting with a user. Various example user interface screenshots are illustrated and discussed below.

The contactless transceiver 240 may enable the mobile device 140 to both transmit and receive (e.g., read) data using contactless communications with a contactless element. That is, the transceiver 240 may operate as both a contactless transmitter and a reader. In some embodiments, the contactless transceiver 240 may be only a reader.

The contactless receiver 240 may operate on the Near Field Communication (NFC) standard, or a NFC reader. The NFC standard employs radio frequency identification (RFID) technology that uses radio frequency electromagnetic fields to transfer data. NFC is a particular type of RFID technology that is configured to only allow contactless communications when the contactless reader is within close proximity to the contactless element (which may also be configured to employ the NFC standard). The use of NFC may enhance security by reducing the likelihood that data stored on the contactless element would be read by contactless readers that are further than the required distance away. Generally, the NFC standard enables bidirectional communication between at least two devices. The NFC standard may include the ISO/IEC 18092 standard and other telecommunication standards defined by the European Telecommunications Standards Institute (ETSI).

The contactless element may include an embedded integrated circuit that enables wireless contactless communication with the contactless reader 132 (e.g., a NFC chip that enables communications via the NFC standard). Through the wireless communication, the contactless element may provide the transaction card information associated with a transaction account to the contactless reader 132. Transaction card information may include any type of information that is made available via the contactless element of the contactless transaction card. This may include card identification numbers, card balances, and the like. For example, in the scenario where the transaction card is a contactless credit card, the transaction card information may include the name of the cardholder, an identifier associated with the transaction account (e.g., a credit card number), an expiry date of the transaction account, and/or a card verification value (CVV).

As noted, the memory 250 may store an e-wallet application that is executable by the processor 210 to configure the contactless transceiver 240 to read the transaction card information from a contactless transaction card 150. In various embodiments, the memory 250 of the mobile device may include different components: a main memory space for the storage of applications, and a separate secure memory space that is only accessible by trusted applications.

In some embodiments, the separate secure memory space may be a secure element. A secure element is a protected processor and memory space of a mobile device 140 that is separate and independent of the main processor and memory space of the mobile device 140. That is, the secure element (secure memory and execution environment) may be an environment in which application code and application data can be securely stored and administered and in which secure execution of applications occur. The secure element may be embodied in highly secure cryptographic chips (e.g., a smart card chip).

Only trusted applications such as an e-wallet application may access the secure element to store data onto it. The secure element may provide delimited memory for each application and functions that encrypt, decrypt, and sign data packets being communicated to and from the secure element. This may increase the security of the secure element and reduce the possibility that the secure element may be tampered with.

In some embodiments, the e-wallet application may be executing on the secure execution environment of the secure element.

The secure element may be provided in various ways on the mobile device 140. For example, the secure element may be coupled with the NFC chip on an integrated integrated circuit, or it may be provided on a Subscriber Identity Module (SIM) card of the mobile device 140, or it may be provided on a removable memory (e.g., microSD) integrated circuit that may be entered into a slot for receiving such memory on the mobile device 140. It will be understood that other methods of providing a secure element on the mobile device 140 may be possible.

Figure 3:
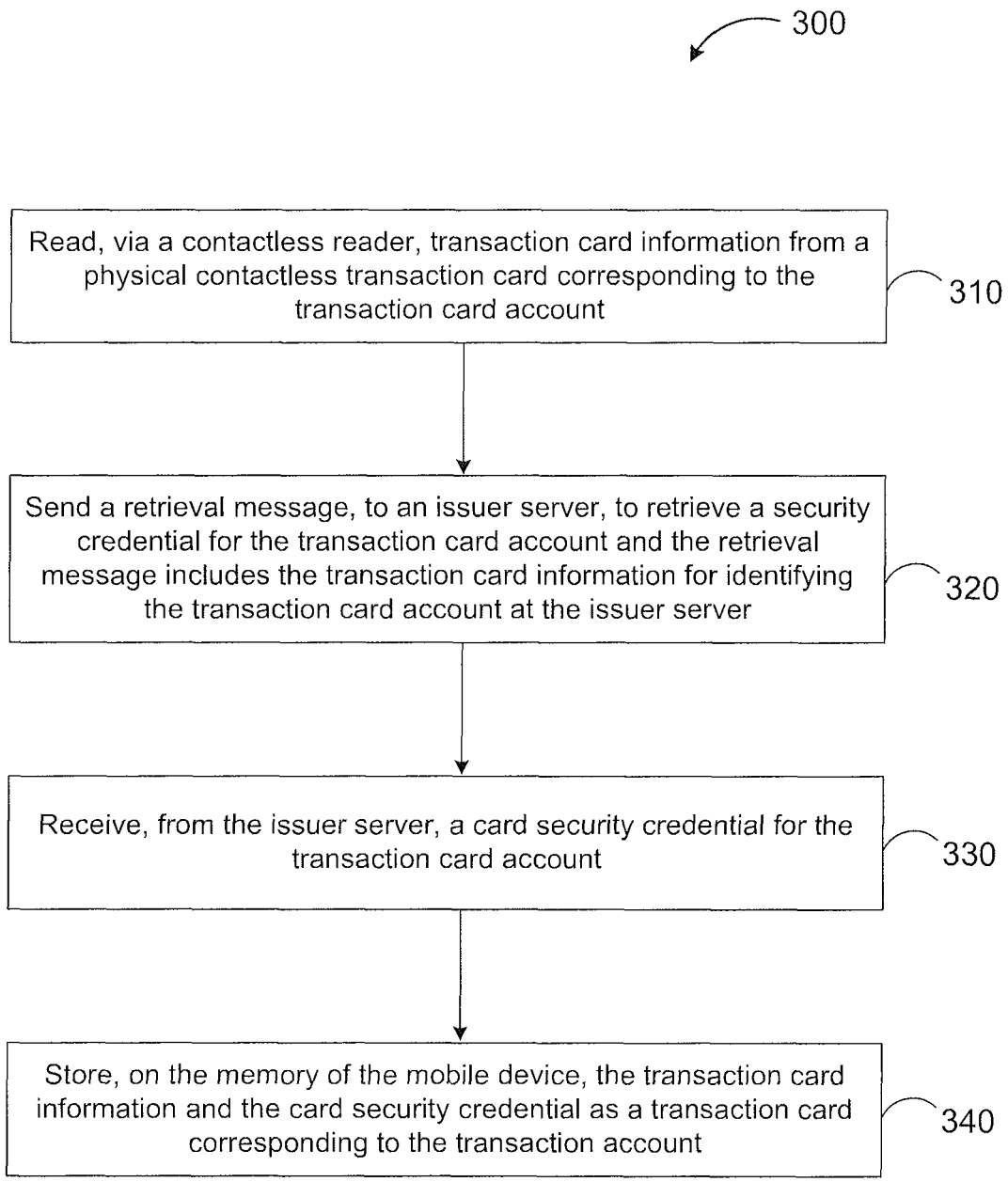
FIG. 3 is a flowchart diagram illustrating the steps of loading a transaction card onto a mobile device, in accordance with an embodiment of the present disclosure.

Referring to FIG. 3, shown is a flowchart diagram illustrating the steps of a method of loading a transaction card onto a mobile device, shown generally as 300. To illustrate the steps of the method, reference will be made simultaneously to FIGS. 4, 5, 6 and 7 which illustrate various example screenshots of a mobile device 140 for an example scenario in which an owner of Visa® credit card, "John Smith", adds his credit card to his mobile device 140.

At 310, the mobile device 140 may read, via the contactless reader, transaction card information from a physical contactless transaction card corresponding to the transaction card account. The contactless reader may comprise a Near Field Communications (NFC) integrated circuit (IC).

As noted above, the contactless transceiver 240 of mobile device 140 may be operable to perform the operations of a contactless reader. However, it will be understood that a contactless transceiver 270 is not required and then a component that is only able to perform contactless reading functions (e.g., a contactless reader) may be sufficient.

Figure 4:
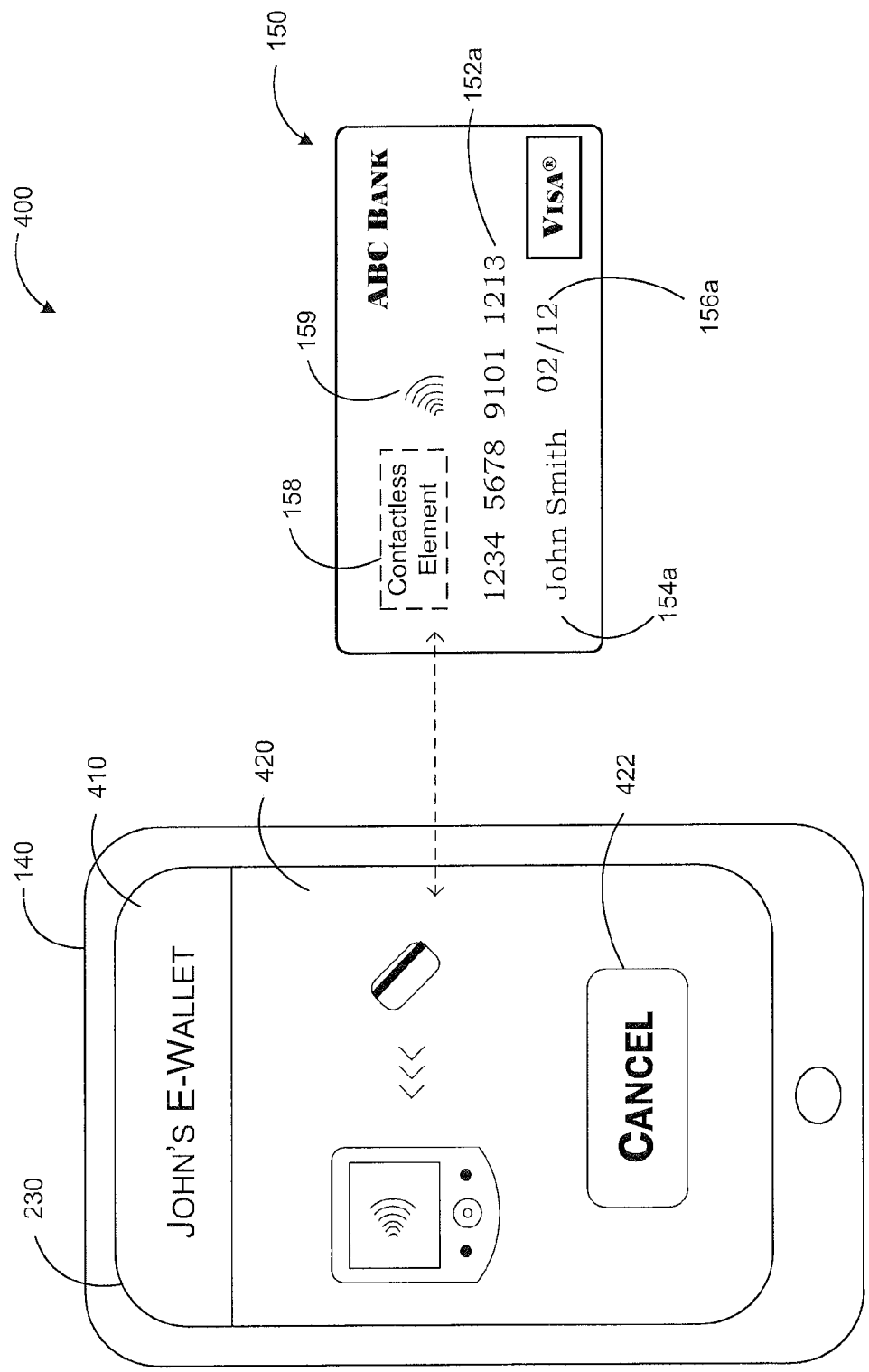
FIG. 4 is an illustration of an example screenshot of a mobile device when preparing to load a transaction card onto the mobile device, in accordance with an embodiment of the present disclosure.

Referring simultaneously to FIG. 4, shown there generally as 400 is an illustration of an example screenshot of a mobile device 140, when preparing to load a transaction card onto the mobile device, in accordance with an embodiment of the present disclosure.

In the example scenario, the physical plastic transaction card 150 corresponds to a Visa® credit card issued by an organization called "ABC Bank". Plastic transaction cards typically include various types of transaction card information on the surface of the card itself. Illustrated as a credit card, the transaction card 150 may include an identifier associated with the contactless transaction card 150 (e.g., as illustrated, a credit card number 150ba), a name 154a of the owner of the credit card, and an expiry date for the credit card 156a. In order to conduct contactless transactions, the contactless transaction card 150 may house a contactless element 158 (which is shown in dotted outline because the contactless element may not be visually apparent from the exterior of the transaction card). The contactless transaction card 150 may also have a symbol 159 displayed on the surface of the card to indicate that it is enabled for contactless transactions.

When operating the e-wallet application stored on the mobile device 140, the e-wallet application may be configured to present a user interface 410 (entitled "John's E-Wallet" in the example scenario) on the display 230 of the mobile device 140. One feature of the e-wallet application may be to enable the loading of a transaction account onto the mobile device 140. Such feature may allow a user to load either manually (i.e., by typing in the transaction card information onto the mobile device through an input mechanism on the mobile device), or by reading the transaction card information from the contactless transaction card 150 via the contactless reader. If the mobile device 140 receives input selecting to load a transaction account by contactless means, the mobile device may be configured present a user interface 420 on the display 230 of the mobile device 140 to request the user to bring the physical plastic contactless card 150 corresponding to the transaction account he/she wishes to load in close proximity to the mobile device 140. Such user interface 420 may include a cancel button 422 to allow a user to cancel the reading operation.

It will be understood that although illustrated in the context of an e-wallet application, an e-wallet application is not required to practice the subject embodiments. For example, the operating system of the mobile device 140 may be configured to directly load the transaction account onto the mobile device 140, without the need of an e-wallet application.

The mobile device 140 may then activate the contactless reader to read the transaction card information from the contactless transaction card 150.

Figure 5:
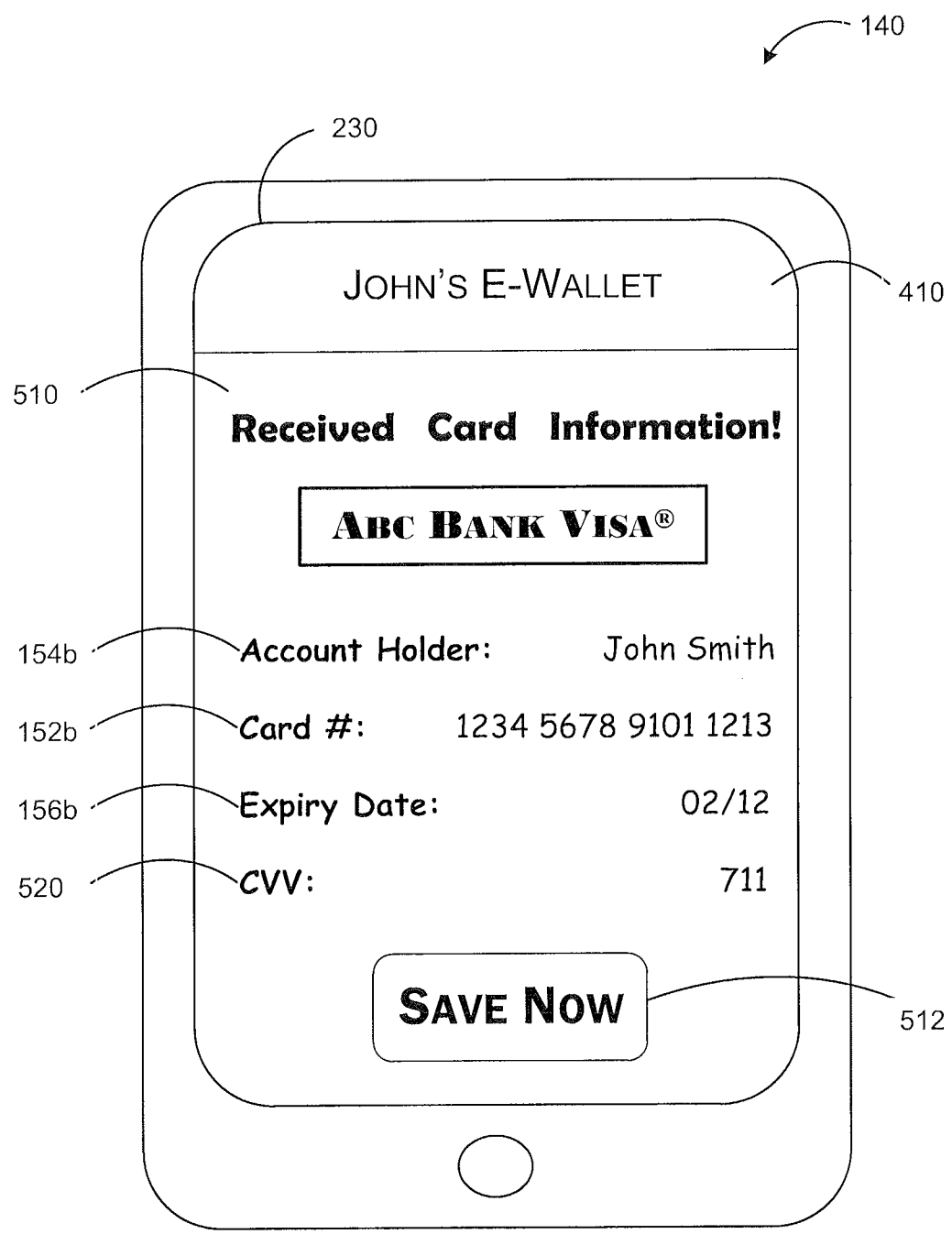
FIG. 5 is an illustration of an example screenshot of a mobile device after transaction card information has been read from a contactless transaction card, in accordance with an embodiment of the present disclosure.

Referring to FIG. 5, therein illustrated is an example screenshot of a mobile device 140 after the transaction card information shown in FIG. 4 has been read from a contactless transaction card 150. Similar to what is shown in FIG. 4, the e-wallet application executing on mobile device 140 may display a user interface 410 in the display 230 of the mobile device 140 that indicates that the transaction card information has been successfully received. For example, this may be a message 510 showing "Received Card Information!"

The mobile device 140 may then display the transaction card information that has been read via the contactless reader. Displaying the transaction card information may allow the user to view and confirm the transaction card information before storing the transaction card onto the mobile device. In the illustrated example in which the owner of the mobile device 140 "John Smith" is loading his "ABC Bank Visa®" card onto his mobile device 140, the mobile device 140 may display the various public details about the credit card on the display 230 of the mobile device 140. For example, the mobile device 140 may display the name of the cardholder 154b, the identifier associated with the transaction account (e.g., the credit card number 150bb), the expiry date for the transaction account 156b, and the card verification value (CVV) 520.

The mobile device 140 may also present a "Save Now" button 512 to allow a user to confirm that the transaction card information that has been read via the contactless reader is correct, and that the user desires to continue with the transaction card loading process.

As noted, existing methods of manually entering the transaction card information into the mobile device 140 may be slow and inaccurate. As such, it may be desirable to read the transaction card information via the contactless reader to improve the speed and accuracy at which the transaction card 150 can be loaded.

Also, existing methods of manually entering transaction card information may be unsecure as it may be possible for a nefarious person to obtain such information (e.g., the name of the card holder, the credit card number, card expiry date and/or the CVV) by stealing it. By reading the transaction card information via the contactless transaction, the mobile device 140 may be able to confirm the presence of the physical plastic card when loading the transaction card onto the mobile device. As it is less likely for a contactless physical plastic card to be cloned than it is simply for the transaction card information to stolen and reused, the subject embodiments may provide enhanced security over existing methods of manually entering the transaction card information onto the mobile device 140.

Storing the transaction card onto the mobile device 140 may not include just simply storing the transaction card information read from the contactless transaction card 150. In various embodiments, the storing may also include storing a card security credential for the transaction card account. For example, the card security credential may be a shared secret (e.g., an encrypted Personal Identification Number (PIN)) that needs to be verified before the mobile device 140 can select the stored transaction account for use in a subsequent purchase transaction).

The card security credential may be retrieved from the issuer server 110.

At 320, the mobile device 140 may send a retrieval message, to an issuer server 110, to retrieve a card security credential for the transaction card account, the retrieval message comprising the transaction card information for identifying the transaction card account at the issuer server 110.

As noted, the issuer server 110 may be a remote server of the issuing organization that issued the transaction card 150. To determine how to contact the issuer server 110, the e-wallet application may be configured to communicate with the e-wallet server 120 to obtain addressing information (e.g., Internet Protocol (IP) addresses, port numbers, domain names, etc.) for the issuer server 110. In various embodiments, the e-wallet server 120 may store addressing information of issuer servers 110 associated with various types of well-known transaction cards (e.g., major credit card companies, debit processing networks, etc.).

At 330, the mobile device 140 may receive, from the issuer server 110, a card security credential for the transaction card account.

In addition to storing the security credential on the mobile device 140, the mobile device 140 may be configured to use the security credential as an added security feature. For example, the mobile device 140 may be configured to display a user interface on the mobile device 140 to receive a security input for verification against the card security credential. For example, the security input may be an inputted Personal Identification Number (PIN) and the card security credential may comprise an encrypted PIN. Such embodiments may enhance security by allowing the authentication of the owner of the transaction account before allowing the storage of the transaction card onto the mobile device 140.

Figure 6:
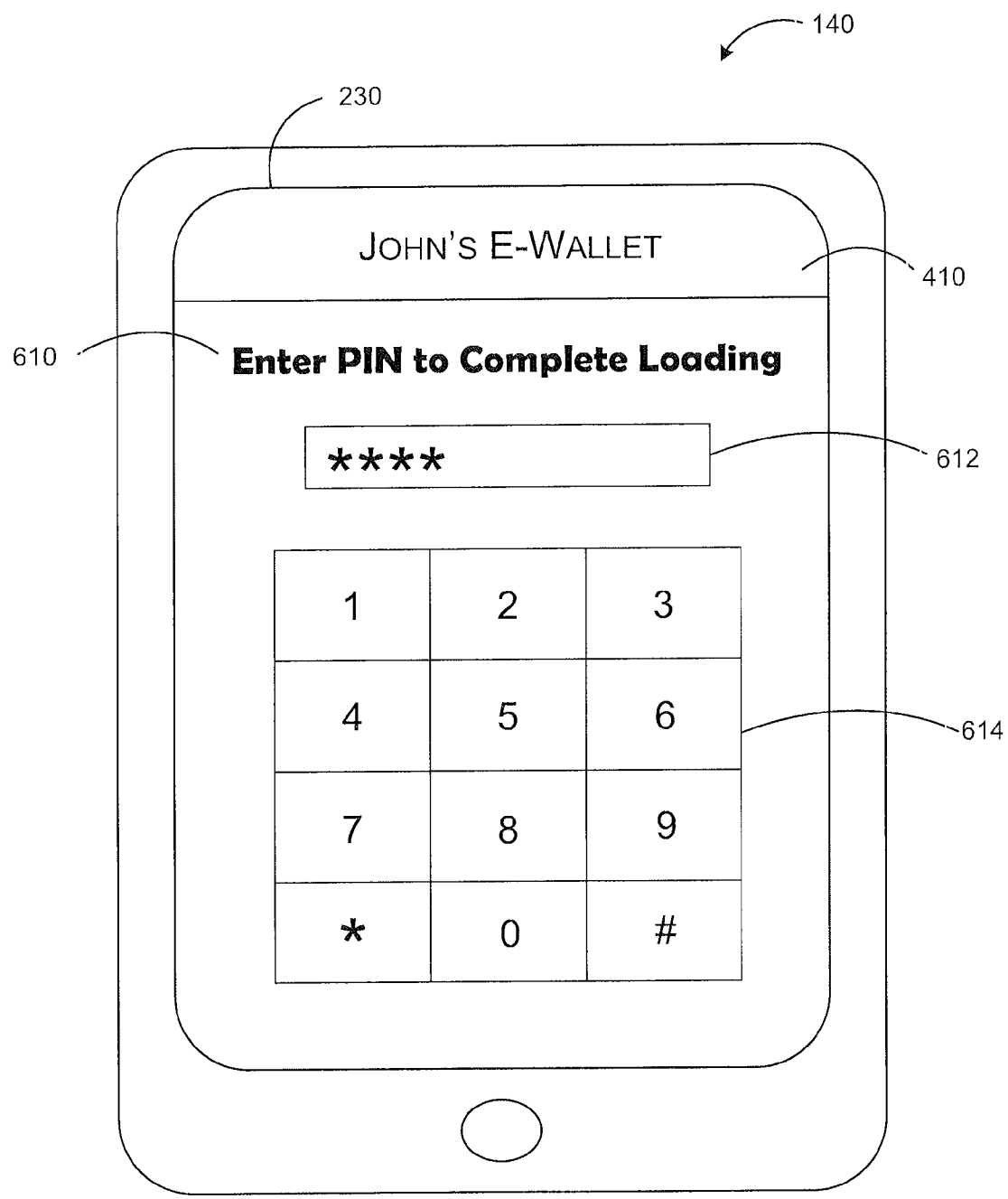
FIG. 6 is an illustration of an example security input screen on a mobile device that may be shown after the screenshot of FIG. 5.

Referring to FIG. 6, shown there is an illustration of an example security input screen of a user interface 410 of the e-wallet application, as configured to be shown on display 230 of the mobile device 140. Continuing with the example, the e-wallet application may, after requesting an encrypted PIN security credential for the "ABC Visa®" card from the issuer server 110, request the entry of a PIN security input for verification against the encrypted PIN that has been received. As illustrated, the security input screen may display a message 610 ("Enter PIN to Complete Loading") informing the user that a PIN needs to be entered and verified to complete the loading process, a keypad 614 for entering the PIN, and a text box 612 to provide feedback when a digit of the keypad 614 is selected.

After the security input has been entered, the mobile device 140 may verify the security input against the received card security credential. For example, in the example scenario, this may involve determining whether the inputted PIN matches the encrypted PIN received from the issuer server 110. In embodiments where the security input does not match the card security credential, the mobile device 140 may display a message rejecting the security input.

At 340, the mobile device 140 may store, on the memory of the mobile device 140, the transaction card information, and the card security credential as a transaction card corresponding to the transaction account. In embodiments where the security input is to be verified, the displaying of a user interface to receive a security input and the verifying of the security input against the card security credential may be performed prior to the storing, with the storing only occurring if the security input is verified.

As the mobile device may be used as the contactless transaction card itself after being stored on the mobile device, the stored transaction card may be treated as another physical transaction card on the same transaction card account by the issuer of the transaction card. To facilitate this, at step 330, when sending the card security credential to the mobile device 140, the issuer server 110 may also assign an additional sequence number to the transaction account for the transaction card that is being stored on mobile device 140.

Also, since the stored transaction card is not a physical plastic card, it may be considered to be a virtual transaction card that is operable to provide the features of a plastic contactless transaction card.

After loading a transaction card account onto the mobile device 140, the mobile device 140 can be configured to be used in various scenarios when the physical plastic contactless card would otherwise be used. For example, the mobile device 140 can be used for conducting mobile payment transactions.

Figure 7:
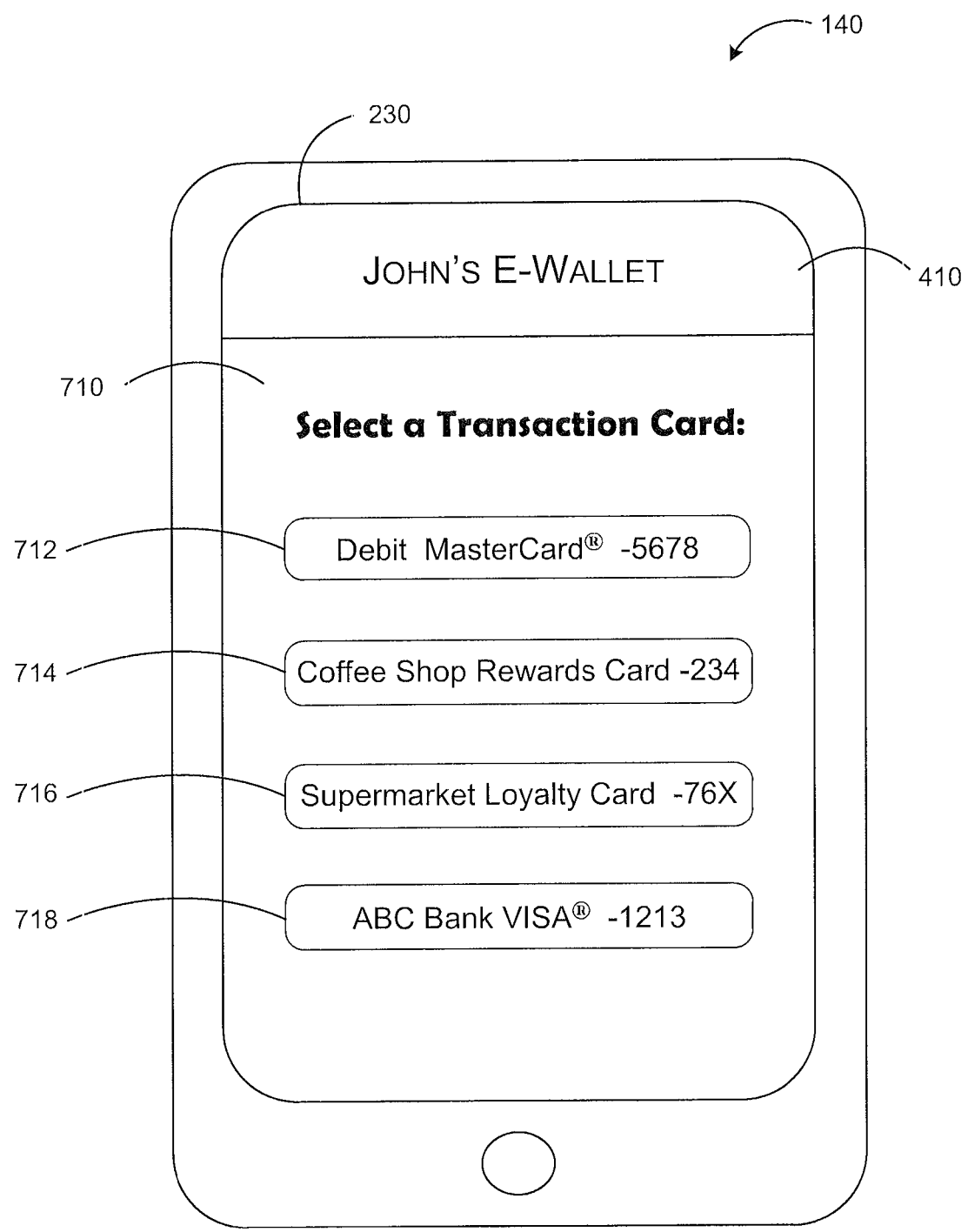
FIG. 7 is an illustration of an example transaction card selection screen after a transaction card has been loaded onto a mobile device.

Referring to FIG. 7, shown there is an illustration of an example transaction card selection screen for a user interface 410 of an e-wallet application, after a transaction card has been loaded, as configured to be shown on display 230 of the mobile device 140. The e-wallet application may present a selection user interface 710 for selecting one of several transaction cards stored on the mobile device 140, for example, when the mobile device 140 is functioning as a contactless transaction card during a financial transaction. In such case, the user interface may display a number of existing stored transaction cards (e.g., "Debit MasterCard®—5678" 712, "Coffee Shop Rewards Card—234" 714, "Supermarket Loyalty Card—76X" 716), as well as the newly added "ABC Bank Visa®—1213" card 718. As illustrated the example user interface shows the name of a name for the transaction card as well a number of trailing digits of a corresponding card number for the transaction card. However, it will be understood that such identification is shown for illustration purposes only, and that other methods of presenting a transaction card selection screen may be possible.

If the mobile device 140 receives input selecting the "ABC Bank Visa®" card 718, the mobile device 140 may be configured to transmit the transaction card information of the stored transaction card via the contactless transceiver 240 during a payment transaction. The mobile payment transactions may include transactions between the mobile device 140 and a point-of-sale (POS) terminal, and/or transactions between parties (peer-to-peer transactions). The peer-to-peer transactions may take place between two mobile devices 140a and 140b (as shown in FIG. 1), for example.

Certain peer-to-peer transactions, such as "I Owe You"s (IOUs), can be difficult to enforce due to their informal nature. IOUs are generally informal acknowledgements of a debt. Generally, no specific repayment terms are provided in an IOU other than an identity of a debtor and an amount owing. As well, it may also be difficult to ensure the earliest possible repayment of the IOU because a party owing the IOU may not remember to repay the IOU even if that party has available funding and/or which IOU, if there are multiple IOUs outstanding, to repay first.

The repayment of IOUs can, thus, be automated so that repayment occurs immediately when repayment funds are available. An IOU may be created on a first mobile device 140a associated with a first transaction account from which the amount owing is paid (an owing transaction account) and the IOU may then be sent to a second mobile device 140b associated with a second transaction account which is to receive the amount owing (a receiving transaction account). An association may then be established between the owing transaction account and the receiving transaction account such that whenever the owing transaction account receives any load amount (e.g., an amount intended by the user to be loaded onto the owing transaction account), that load amount is first used for repaying the amount owing under the IOU. The various embodiments described below generally relate to a method of processing the amount owing from the owing transaction account to the receiving transaction account, including using the load amount to repay the amount owing.

For ease of exposition, reference is made simultaneously to FIGS. 8 to 12 for describing processing the amount owing from the owing transaction account to the receiving transaction account.

Figure 8:
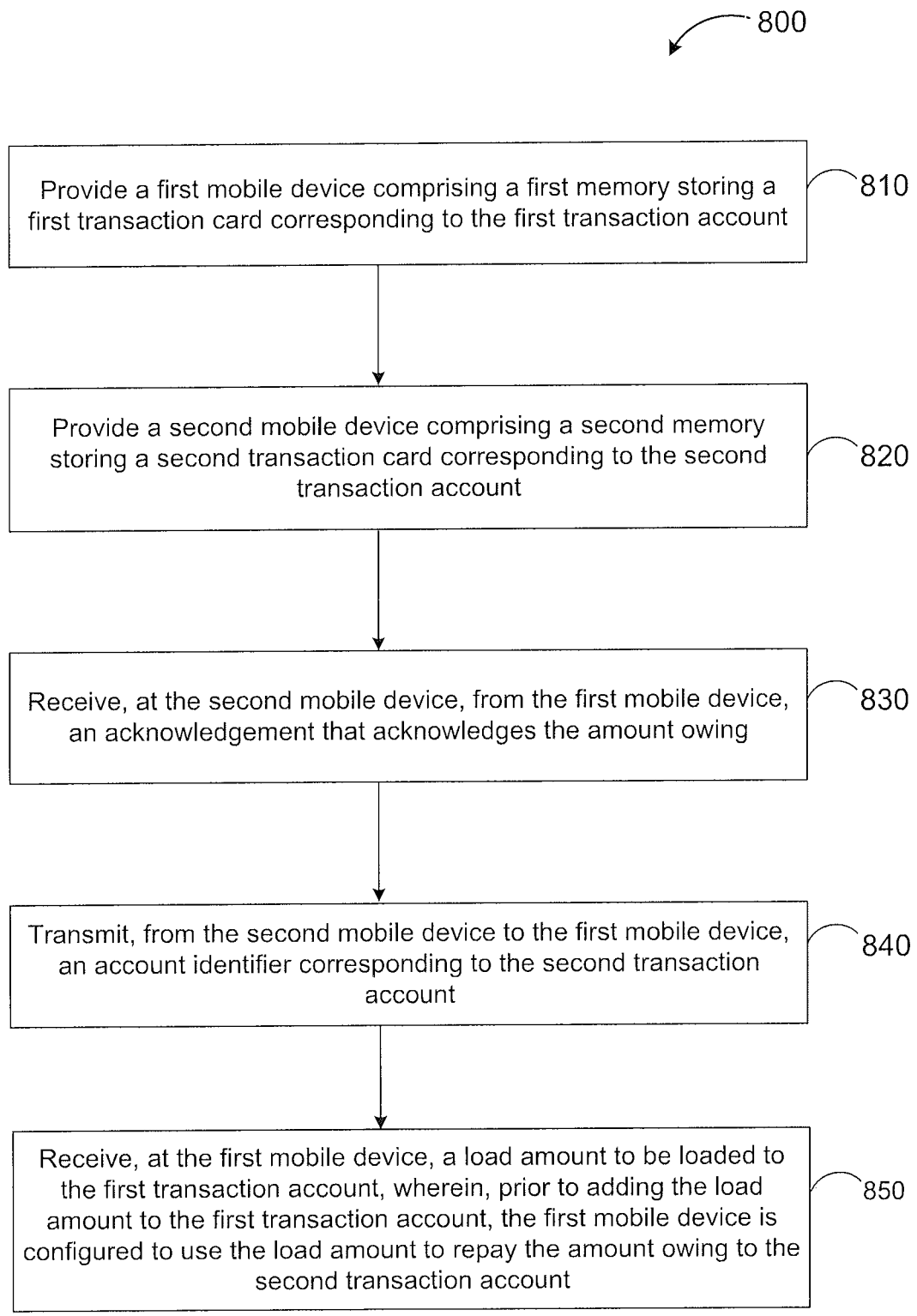
FIG. 8 is a flowchart diagram illustrating the steps of processing repayment for an amount owing, in accordance with an embodiment of the present disclosure.

Referring now to FIG. 8, shown therein is a flowchart diagram 800 illustrating the steps of processing repayment of an amount owing.

At step 810, the first mobile device 140a with a first memory 250 storing the first transaction card 150a that corresponds to the first transaction account is provided.

At step 820, the second mobile device 140b with a second memory 250 storing the second transaction card 150b corresponding to the second transaction account is provided.

As generally illustrated in FIG. 1, each transaction account corresponding to the transaction cards 150a and 150b may be loaded onto the mobile devices 140a and 140b. For example, a transaction account can be loaded onto the memory 250 of each of the mobile devices 140a and 140b using the method described above or alternatively, through manual entry of the transaction card information. It will be understood that each memory 250 may store multiple transaction accounts. As described above, the memory 250 may be housed in a secure element.

Figure 9:
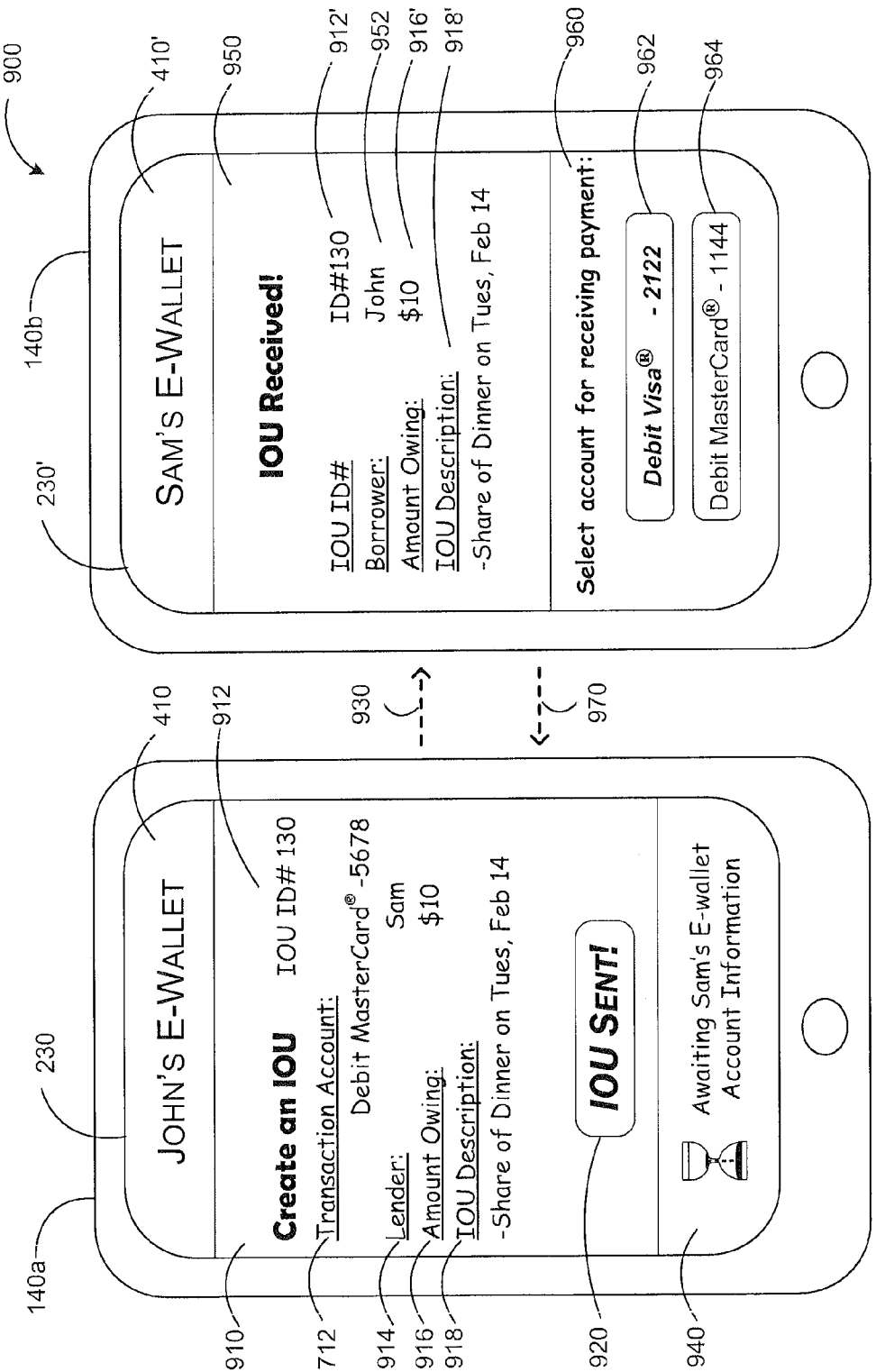
FIG. 9 is a diagram illustrating the creating and receiving of an acknowledgement that acknowledges an amount owing, in accordance with an embodiment of the present disclosure.

Referring now to FIG. 9, therein illustrated a diagram 900 of a communication between two mobile devices 140a and 140b.

As described above, the first mobile device 140a may include the display 230 and may be configured to operate an e-wallet application. The e-wallet application may include an e-wallet user interface (UI) 410. Similarly, the second mobile device 140b also includes a display 230' and may also be configured to operate the e-wallet application. The e-wallet application stored on the memory 250 of the second mobile device 140b may also include an e-wallet UI 410'. It will be understood that the e-wallet applications on each of the first and second mobile devices 140 and 140b may be the same or different types of e-wallet applications as long as each e-wallet application is compatible for communication with each other.

As illustrated in FIG. 9, the e-wallet UI 410 may provide a UI for creating an IOU 910 (an 'IOU creation UI'). It will be understood that the IOU creation UI 910 may be a separate software application from the e-wallet application. It will be further understood that the configuration of the illustrated IOU creation UI 910 is merely an example and that alternative configurations may similarly be used.

The IOU creation UI 910 may include a field 912 for identifying each IOU (an 'IOU identifier (ID)') and various data fields for receiving information associated with the IOU. For example, this may include a field 712 for selecting an owing transaction account (an 'owing transaction account field'), a field 914 for identifying a party to receive the acknowledgement (a 'lender field'), a field 916 for identifying an amount owing (an 'amount owing field'), and a field 918 for describing a context of the IOU (an 'IOU description field'). Furthermore, the IOU creation UI 910 may include a selection button 920 for confirming and submitting the IOU to be sent (an 'IOU submission button'). The IOU submission button 920 may also indicate a status of the delivery of the IOU.

For ease of exposition and consistency, this example embodiment continues from the example described above with respect to FIGS. 4-7. In this example embodiment, the e-wallet UI 410 indicates that the e-wallet is associated with "John". From the IOU creation UI 910, the IOU ID 912 of the IOU being created is "IOU ID#130", the owing transaction account field 712 indicates that the user "John" has selected to repay the amount owing 916 using the Debit MasterCard® ending with the number "5678", the lender field 914 indicates that "Sam" is to receive the amount owing 916, the amount owing field 916 indicates that the amount owing is "$10", and the IOU description field 918 indicates that the amount owing 916 is for "John's share of dinner on Tues, February 14". Furthermore, the IOU submission button 920 indicates that John has submitted and sent the IOU. As illustrated in FIG. 9, the IOU has been transmitted to the second mobile device 140b, via a communications 930.

As described above, each of the mobile devices 140a and 140b may include various communications modules 220 (as shown in FIG. 2). In some embodiments, the IOU, or acknowledgement of an amount owing, may be transmitted from the mobile device 140a using its contactless transceiver 240. In some embodiments, the IOU, or acknowledgement of an amount owing, may be received at the second mobile device 140b using its contactless transceiver 240. In some further embodiments, the contactless transceiver 240 in each of the first and second mobile devices 140a and 140b may be a NFC transceiver.

In some alternative embodiments, the mobile devices 140a and 140b may transmit and receive, respectively, the repayment acknowledgment through any of the above described communication standards.

At step 830, the second mobile device 140b may receive, from the first mobile device 140a, the acknowledgement 930 acknowledging the amount owing.

Referring still to FIG. 9, the e-wallet UI 410' on the second mobile device 140b indicates that the e-wallet application stored on the second mobile device 140b belongs to "Sam". On receipt of an IOU, the e-wallet UI 410' may provide a display 950 for indicating to a user that an IOU has been received (a received IOU display). It will be understood that the received IOU display 950 may be a separate software application from the e-wallet UI 410'. It will be further understood that the configuration of the illustrated received IOU display 950 is merely an example and that alternative configurations may similarly be used.

The received IOU display 950 may include several data fields describing the received IOU. These data fields may correspond to those provided in the IOU creation UI 910, such as the IOU ID 912', the amount owing field 916', and the IOU description field 918'. Additionally, the received IOU display 950 may further include a field 952 identifying a party who sent the IOU (a 'borrower field').

As illustrated in the received IOU display 950 in FIG. 9, the IOU ID 912' of the received IOU is "ID#130", the amount owing field 916' indicates that the amount owing is "$10", and the IOU description field 918' indicates that the amount owing 916' is for John's "share of dinner on Tues, February 14". As shown in FIG. 9, the data fields associated with the IOU created on John's e-wallet UI 410 (IOU ID#130) corresponds with the IOU received by the second mobile device 140b, as shown on Sam's e-wallet UI 410'.

After the acknowledgement is received by the second mobile device 140b, the second mobile device 140b may be prompted to provide the mobile device 140a with an account identifier corresponding to the receiving transaction account. The account identifier helps to establish an association between the receiving transaction account and the owing transaction account 712 so that the repayment of the IOU from the owing transaction account 712 may be automated.

At step 840, the second mobile device 140b may transmit to the first mobile device 140a, the account identifier corresponding to the second transaction account.

In some embodiments, the account identifier may be associated with an identifier corresponding to an electronic wallet account. For example, the account identifier transmitted by the second mobile device 140b to the first mobile device 140a may correspond to an identifier associated with Sam's electronic wallet account. As discussed above, the e-wallet identifiers may be stored on the e-wallet database 122 on the e-wallet server 120.

As illustrated in FIG. 9, the IOU creation UI 910 may include a status field 940 for indicating a status of receiving the account identifier (a 'status receiving field'), and the received IOU display 950 may further include a UI 960 for selecting an account for receiving the amount owing 916 (an 'account selecting UI'). In this example embodiment, the status receiving field 940 indicates that the first mobile device 140a is currently awaiting receipt of the account identifier from the second mobile device 140b.

As illustrated in FIG. 9, the account selecting UI 960 includes two transaction accounts 962 and 964 that may be selected for receiving the amount owing 916. It will be understood that fewer or more transaction accounts may be provided in the account selecting UI 960.

In this example embodiment, the transaction account 962 associated with the "Debit Visa®" card ending in "2122" is selected.

In some embodiments, the receiving transaction account may be a default transaction account for receiving the amount owing 916. Therefore, the account selecting UI 960 may not be provided.

As described above, each of the mobile devices 140a and 140b may include various communications modules. In some embodiments, the account identifier may be transmitted 930 from the second mobile device 140b using its contactless transceiver. In some embodiments, the account identifier may be received at the first mobile device 140*a* using its contactless transceiver.

In some alternative embodiments, the mobile devices 140*a* and 140*b* may transmit and receive, respectively, the account identifier through any of the above described communication standards.

After the first mobile device 140*a* receives the account identifier from the second mobile device 140*b*, any amount that is intended to be loaded onto the owing transaction account 712 would first be used for repaying the amount owing 916 to the receiving transaction account 962 corresponding to the received account identifier.

At step 850, the first mobile device 140*a* may receive a load amount to be loaded to the first transaction account 712, wherein, prior to adding the load amount to the first transaction account 712, the first mobile device 140*a* is configured to use the load amount to repay the amount owing 916 to the second transaction account 962.

Figure 10:
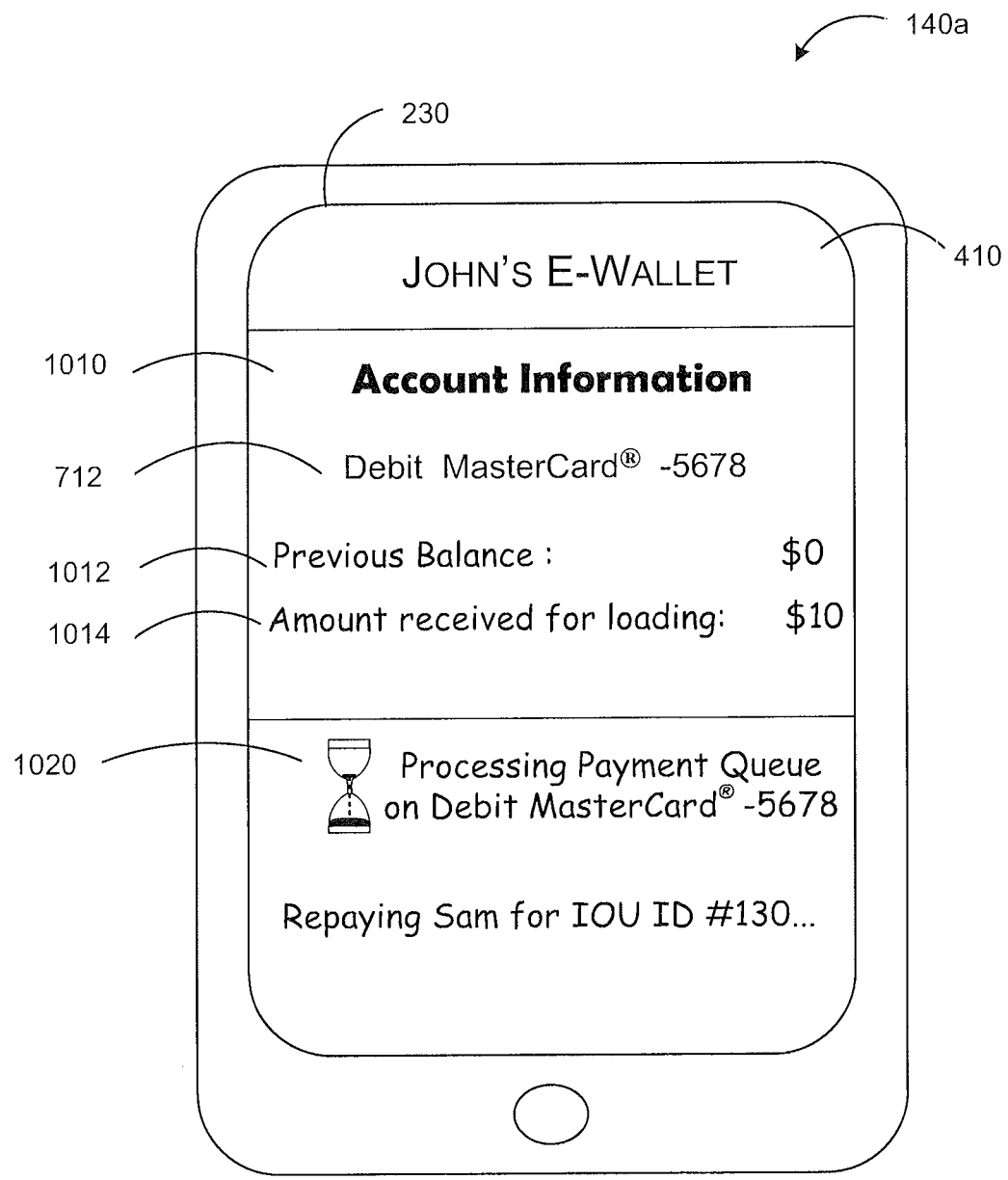
FIG. 10 is an example screenshot on a mobile device after receiving a load amount, in accordance with an embodiment of the present disclosure.

Continuing with the example embodiment of FIG. 9, but referring now to FIG. 10, therein illustrated an example account balance 1010 after receiving the load amount.

As illustrated in FIG. 10, the account balance 1010 after receiving the load amount may include the owing transaction account field 712, a field 1012 for indicating an account balance prior to receiving the load amount (a 'previous balance field') and a field 1014 for indicating an amount that was received for loading (a 'received load amount field').

As described with reference to FIG. 9, the owing transaction account field 712 is the "Debt MasterCard®" ending in "5678". As well, the received load amount field 1014 indicates that the owing transaction account 712 received the load amount of "$10", and the previous balance field 1012 indicates that the owing transaction account 712 had a balance of "$0" prior to receiving the load amount 1014.

After the owing transaction account 712 receives the load amount 1014 of $10, the first mobile device 140*a* is configured to first process any IOUs associated with the owing transaction account 712. As shown in FIG. 10, a status field 1020 may be provided to show that the IOUs associated with the owing transaction account 712 is being processed (an IOU status field). In this example embodiment, the first mobile device 140*a* determines that the IOU ID#130 associated with the owing transaction account 712 is to be repaid with the received load amount 1014.

In some embodiments of processing a repayment of an amount owing 916, the first mobile device 140*a* transmits a repayment message to the e-wallet server 120. As discussed above, the e-wallet server 120 may include an e-wallet database 122 for storing account identifiers and identifiers associated with transaction accounts corresponding to the account identifiers. The e-wallet database 122 may be further configured to store data identifying which of the transaction accounts is to receive the amount owing 916.

The repayment message may include the received account identifier and the load amount 1014 for repaying the amount owing 916 to the receiving transaction account 962. Using the repayment message, the e-wallet server 120 may be configured to identify the receiving transaction account 962 that corresponds to the received account identifier. After having identified the receiving transaction account, the e-wallet server 120 may add the load amount 1014 to the identified receiving transaction account 962 by, for example, communicating with an issuer server 110 for the receiving transaction account 962.

In some embodiments, if the load amount 1014 is greater than the amount owing 916, the portion of the load amount 1014 that remains after paying the amount owing 916 is added to the first transaction account 712. In some alternate embodiments, if the load amount 1014 is less than the amount owing 916, the amount owing 916 is reduced by the load amount 1014.

In some embodiments, multiple amounts owing 916 under multiple IOUs may be associated with an owing transaction account 712 and the multiple amounts owing 916 may form a payment queue. The payment queue may be stored on a memory of the mobile device associated with the owing transaction account 712, as will be described below.

Referring now to FIG. 11, therein illustrated an example payment received notification 1110.

Continuing the example from FIG. 10, after the first mobile device 140*a* processes the amount owing 916 under IOU "ID#130", the second mobile device 140*b* that is associated with the receiving transaction account 962 may receive a payment received notification 1110 for indicating that IOU "ID#130" has been repaid. Correspondingly, the account balance 1010 associated with the owing transaction account 712 may be updated and again provided to the first mobile device 140*a*.

Referring to FIG. 12, therein illustrated the example account balance 1010' of the owing transaction account 712 after the amount owing 916 is repaid. As illustrated in the updated IOU status field 1020', the IOU "ID#130" has been repaid using the owing transaction account 712. Accordingly, a field 1212 showing a current balance of the owing transaction account 712 indicates that there is "$0" remaining since the received load amount 1014 (shown in FIG. 10) has been repaid to the receiving transaction account 962.

Figure 13:
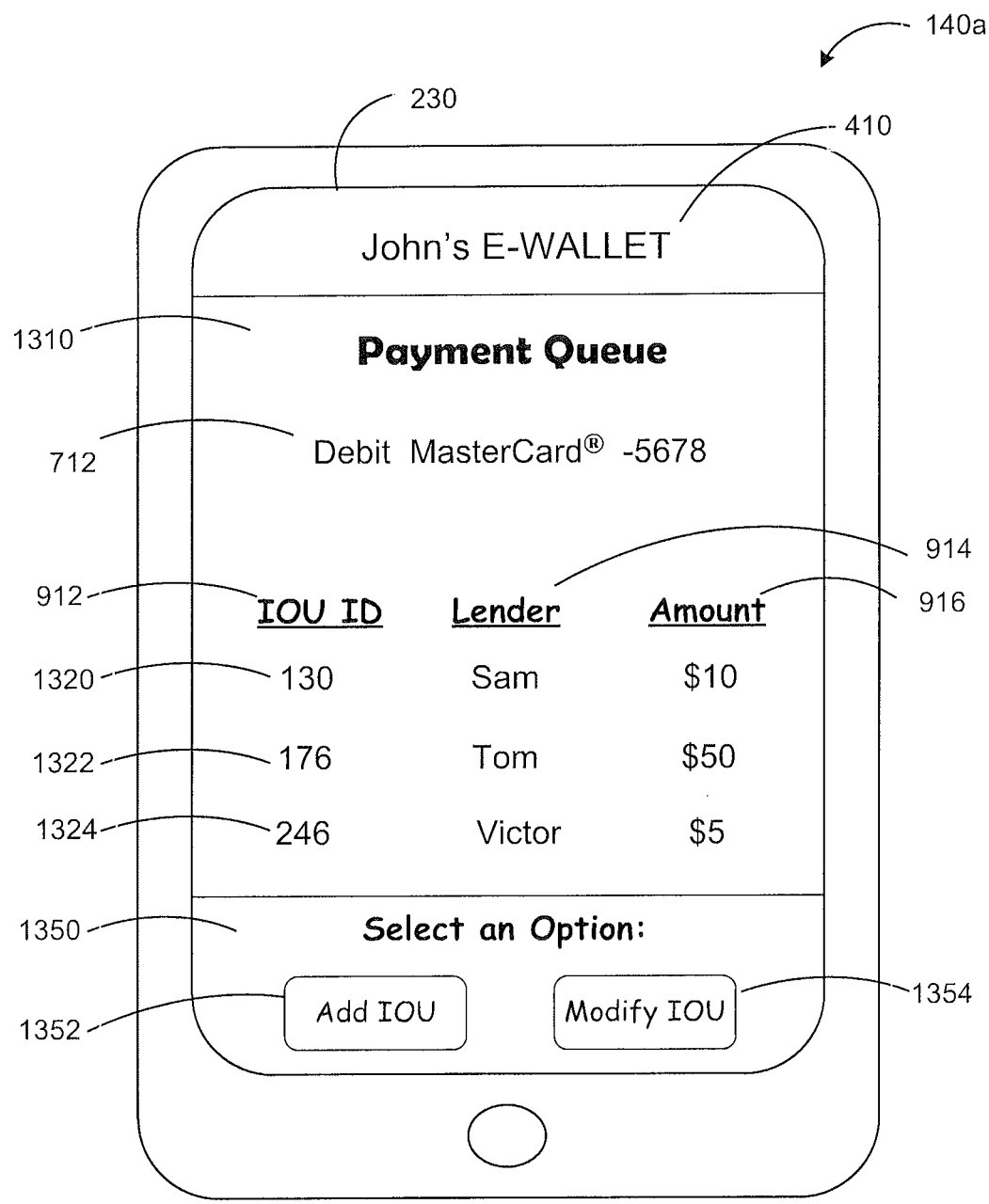
FIG. 13 is an example screenshot of a payment queue, in accordance with an embodiment of the present disclosure.

Referring now to FIG. 13, shown there is a screenshot of an example payment queue 1310. As described briefly above, the owing transaction account 712 may be associated with multiple amounts owing 916 under multiple IOUs. In some embodiments, the multiple amounts owing 916 may form a payment queue 1310. As illustrated in FIG. 13, the example payment queue 1310 includes three different amounts owing 1320, 1322 and 1324 that are each associated with a different IOU ID 912 and a different lender 914. It will be understood one or more of the lender fields 914 in the payment queue 1310 may include the same lender.

The payment queue can be considered a queue because load amounts may go towards paying off IOUs in the order in which the lenders are presented in the queue. For example, the amount of "$10" illustrated in FIG. 10 was directed towards paying off "Sam" before paying off "Tom" or "Victor" because the "IOU ID" for "Sam" was in the first position in the queue.

In addition to the payment queue 1310, an UI 1350 for editing the payment queue (an 'IOU editing UI') may be provided. For example, a selection button 1352 may be provided for adding an IOU to the payment queue 1310 (an 'add IOU button') and another selection button 1354 may be provided for modifying an existing IOU (a 'modify IOU button'). When the add IOU button 1352 is selected, the mobile device 140 may receive a signal indicating that a new IOU is to be created and the mobile device 140 may be configured to provide the IOU creation UI 910, as described above, so that the new IOU can be created. Similarly, when the modify IOU button 1354 is selected, the mobile device 140 may receive a signal indicating that one or more of the existing IOUs 1320, 1322 and 1324 is to be modified, and the mobile device 140 may be configured for providing any such modifications. Example modifications include the order in which the existing IOUs 1320, 1322 and 1324 are repaid (i.e., the positions that each IOU may be placed in the payment queue). In another example, any of the amounts owing field 916 and the lender field 914 may be modified.

It will be understood that the functionalities provided by the selection buttons 1352 and 1354 are merely examples and that other functionalities associated with the payment queue may be provided.

Figure 14:
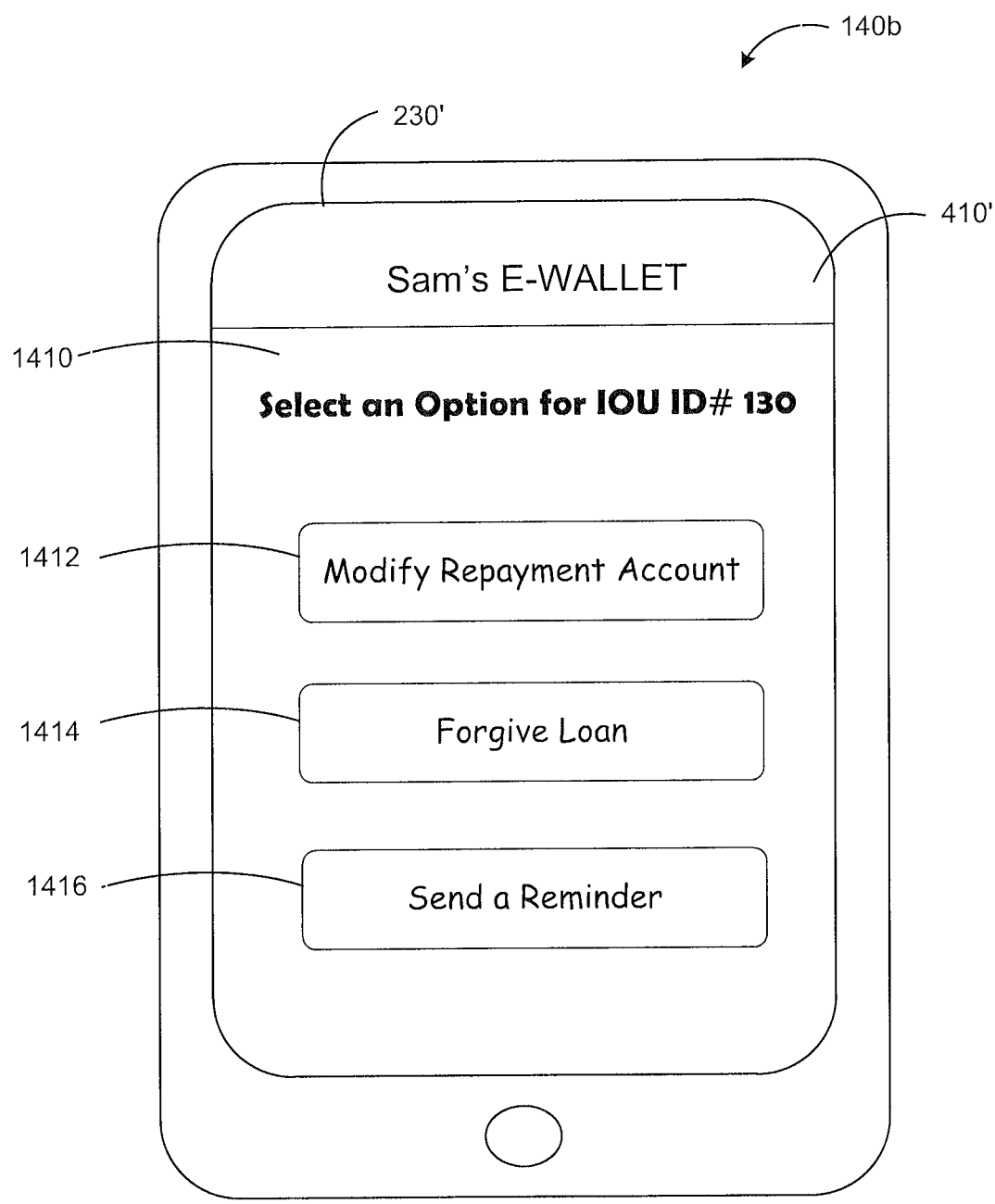
FIG. 14 is an example user interface for selecting options associated with the amount owing.

Referring now to FIG. 14, therein illustrated an example UI 1410 for selecting options associated with the amount owing 916 at a second mobile device 140*b*.

As described above with reference to FIG. 9, the second mobile device 140*b* may provide the account selecting UI 960 for receiving data indicating which receiving transaction account 962 is selected for receiving the amount owing 916. In various embodiments, the second mobile device 140*b* may be further configured to provide an UI 1410 for selecting multiple options associated with an IOU.

In the example embodiment of FIG. 14, three different selection buttons 1412, 1414 and 1416 are provided. It will be understood that fewer or more selection buttons may be provided. It will be further understood that other UI configurations may be used.

A first selection button 1412 may provide for modifying of a repayment account (a modify repayment account button), a second selection button 1414 may provide for an IOU to be forgiven (an IOU forgiving button), and a third selection button 1416 may provide for sending of a reminder of the IOU to the owing party (a reminder button).

When the modify repayment account button 1412 is selected, the second mobile device 140*b* may receive a signal indicating that the selected receiving transaction account 962 is to be edited and/or changed. The second mobile device 140*b* may be configured to provide the account selecting UI 960 again, or a variation of the account selecting UI 960 may be provided to allow the changing of the receiving transaction account for the indicated IOU.

When the IOU forgiving button 1414 is selected, the second mobile device 140*b* receives a data signal indicating that IOU #130 is to be cancelled. The second mobile device 140*b* may be configured to delete IOU #130. This may also involve the second mobile device 140*b* communicating with the e-wallet server 120 to indicate to the IOU has been forgiven. The e-wallet server 120 may, in turn, relay this message to the first mobile device 140*a* so that the e-wallet application stored on the first mobile device 140*a* may update the various statuses of the IOUs stored in its payment queue. Additionally or alternatively, such communication indicating the IOU has been forgiven may sent directly from the second mobile device 140*b* to the first mobile device 140*a*.

When the reminder button 1416 is selected, the second mobile device 140*b* receives a data signal indicating that a reminder message is to be sent to the first mobile device 140*a* to remind the first mobile device 140*a* of IOU #130.

The present invention has been described here by way of example only. Various modification and variations may be made to these exemplary embodiments without departing from the spirit and scope of the invention, which is limited only by the appended claims.

For example, the steps of a method in accordance with any of the embodiments described herein may be performed in any order, whether or not such steps are described in the claims, figures or otherwise in any sequential numbered or lettered manner. Also, in the various user interfaces illustrated in the figures, it will be understood that the illustrated user interface text and controls are provided as examples only and are not meant to be limiting. Other suitable user interface elements may be possible.

We claim:

1. A method of loading a transaction card account onto a mobile device, the mobile device comprising a memory and a contactless reader, the method comprising:
    reading, via the contactless reader, transaction card information from a physical contactless transaction card corresponding to the transaction card account;
    obtaining addressing information for an issuer server from an electronic wallet server;
    sending a retrieval message, to the issuer server identified by the addressing information, to retrieve a card security credential for the transaction card account, the retrieval message comprising the transaction card information for identifying the transaction card account at the issuer server;
    receiving the card security credential for the transaction card account from the issuer server, the card security credential having been transmitted from the issuer server in response to the retrieval message being received at the issuer server; and
    storing,
        the transaction card information read from the physical contactless transaction card; and
        the card security credential received from the issuer server;
    on the memory of the mobile device, such that after the storing, the mobile device is usable as another physical contactless transaction card associated with the transaction card account during a payment transaction.

2. The method of claim 1, wherein the mobile device comprises a secure element, and the memory is housed in the secure element.

3. The method of claim 1, wherein the contactless reader comprises a Near Field Communications (NFC) integrated circuit (IC).

4. The method of claim 1, further comprising
    displaying a user interface on the mobile device to receive a security input for verification against the card security credential; and
    verifying the security input against the card security credential.

5. The method of claim 4, wherein the displaying and verifying is performed prior to the storing in order to authenticate an owner of the transaction card account.

6. The method of claim 1, wherein the security input comprises an inputted Personal Identification Number (PIN) and the card security credential comprises an encrypted PIN, and wherein, the verifying comprises determining whether the inputted PIN matches the encrypted PIN.

7. The method of claim 1, wherein the mobile device comprises a contactless transmitter, and the mobile device is configured to transmit the stored transaction card information via the contactless transmitter during the payment transaction.

8. The method of claim 7, wherein the mobile device comprises a contactless transceiver that comprises the contactless reader and the contactless transmitter.

9. A system for loading a transaction card account, the system comprising,
    a mobile device comprising a processor; a contactless reader operatively coupled to the processor; and a memory storing a plurality of instructions, which when executed by the processor causes the processor to:
        read, via the contactless reader, transaction card information from a physical contactless transaction card corresponding to the transaction card account;
        obtain addressing information for an issuer server from an electronic wallet server;

send a retrieval message, to the issuer server identified by the addressing information, to retrieve a card security credential for the transaction card account, the retrieval message comprising the transaction card information for identifying the transaction card account at the issuer server;

receive the card security credential for the transaction card account from the issuer server, the card security credential having been transmitted from the issuer server in response to the retrieval message being received at the issuer server; and store,
- the transaction card information read from the physical contactless transaction card; and
- the card security credential received from the issuer server;

on the memory of the mobile device, such that after the storing, the mobile device is usable as another physical contactless transaction card associated with the transaction card account during a payment transaction.

10. The system of claim 9, wherein the mobile device comprises a secure element, and the memory is housed in the secure element.

11. The system of claim 9, wherein the contactless reader comprises a Near Field Communications (NFC) integrated circuit (IC).

12. The system of claim 9, wherein the processor is further configured to:
display a user interface on the mobile device to receive a security input for verification against the card security credential; and
verify the security input against the card security credential.

13. The system of claim 12, wherein the displaying and verifying is performed prior to the storing in order to authenticate an owner of the transaction card account.

14. The system of claim 9, wherein the security input comprises an inputted Personal Identification Number (PIN) and the card security credential comprises an encrypted PIN, and wherein, the verifying comprises determining whether the inputted PIN matches the encrypted PIN.

15. The system of claim 9, wherein the mobile device comprises a contactless transmitter, and the mobile device is configured to transmit the stored transaction card information via the contactless transmitter during the payment transaction.

16. The system of claim 15, wherein the mobile device comprises a contactless transceiver that comprises the contactless reader and the contactless transmitter.

17. A non-transitory computer readable medium on which a plurality of executable instructions is stored, wherein when the instructions are executed by a processor, the processor is capable of:

reading, via the contactless reader, transaction card information from a physical contactless transaction card corresponding to the transaction card account;

obtaining addressing information for an issuer server from an electronic wallet server;

sending a retrieval message, to the issuer server identified by the addressing information, to retrieve a card security credential for the transaction card account, the retrieval message comprising the transaction card information for identifying the transaction card account at the issuer server;

receiving the card security credential for the transaction card account from the issuer server, the card security credential having been transmitted from the issuer server in response to the retrieval message being received at the issuer server; and storing,
- the transaction card information read from the physical contactless transaction card; and
- the card security credential received from the issuer server;

on the memory of the mobile device, such that after the storing, the mobile device is usable as another physical contactless transaction card associated with the transaction card account during a payment transaction.

18. The computer readable medium of claim 17, wherein the instructions further configure the processor to:
display a user interface on the mobile device to receive a security input for verification against the card security credential; and
verify the security input against the card security credential.

19. The computer readable medium of claim 18, wherein the displaying and verifying is performed prior to the storing in order to authenticate an owner of the transaction card account.

20. The computer readable medium of claim 18, wherein the security input comprises an inputted Personal Identification Number (PIN) and the card security credential comprises an encrypted PIN, and wherein, the verifying comprises determining whether the inputted PIN matches the encrypted PIN.

* * * * *